(12) United States Patent
Yang et al.

(10) Patent No.: US 10,322,676 B2
(45) Date of Patent: Jun. 18, 2019

(54) VEHICLE SIDE BAR AND VEHICLE WITH THE SAME

(71) Applicant: WINBO-Dongjian Automotive Technology Co., Ltd., Foshan, Guangdong Province (CN)

(72) Inventors: JIe Yang, Foshan (CN); Weiting He, Foshan (CN); Guowei Lin, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 15/824,997

(22) Filed: Nov. 28, 2017

(65) Prior Publication Data
US 2019/0054860 A1    Feb. 21, 2019

(30) Foreign Application Priority Data

Aug. 16, 2017   (CN) .......................... 2017 1 0705939

(51) Int. Cl.
*B60R 3/00*   (2006.01)

(52) U.S. Cl.
CPC .................................... *B60R 3/002* (2013.01)

(58) Field of Classification Search
CPC ................................. B60R 3/00; B60R 3/002
See application file for complete search history.

(56) References Cited

U.S. PATENT DOCUMENTS

| | | | | |
|---|---|---|---|---|
| D546,745 S | * | 7/2007 | Storer | D12/203 |
| D568,222 S | * | 5/2008 | Storer | D12/203 |
| 7,717,444 B2 | * | 5/2010 | Fichter | B60R 3/00 280/163 |
| D665,713 S | * | 8/2012 | Pochurek | D12/203 |
| D671,874 S | * | 12/2012 | Kekich, Jr. | D12/203 |
| 8,448,967 B2 | * | 5/2013 | Storer | B60R 3/002 280/163 |
| D720,674 S | * | 1/2015 | Stanesic | D12/203 |
| D766,797 S | * | 9/2016 | Li | D12/203 |
| 2003/0085545 A1 | * | 5/2003 | Fichter | B60R 3/00 280/163 |
| 2008/0231013 A1 | * | 9/2008 | Richardson | B60R 3/00 280/163 |
| 2013/0221632 A1 | * | 8/2013 | Higgs | B60R 3/00 280/169 |
| 2016/0075285 A1 | * | 3/2016 | Crandall | B60R 3/002 280/163 |

* cited by examiner

*Primary Examiner* — Hau V Phan

(57) ABSTRACT

A vehicle side bar for a vehicle is disclosed. The vehicle side bar includes: a first bar; a second bar connected to the first bar, wherein the first bar and the second bar cooperatively form a supporting frame defining a hollow space; and a step engaged in the hollow, configured to be mounted on the supporting frame. The vehicle side bar provides a robust step configuration to assist the driver or the passenger in entering or existing the vehicle.

18 Claims, 3 Drawing Sheets

VEHICLE SIDE BAR AND VEHICLE WITH THE SAME

CROSS REFERENCE TO RELATED APPLICATIONS

This application claims priority to China Patent Application No. 201710705939.1 filed on Aug. 16, 2017 in the State Intellectual Property Office of China, the content of which is hereby incorporated by reference herein.

TECHNICAL FIELD

The present disclosure generally relates to the automotive accessory field, and in particular to a vehicle side bar and a vehicle with the same.

BACKGROUND

The chassis of a raised vehicle, such as a SUV or a pickup truck, is usually a far distance from the ground making it inconvenient for a user to enter or exit. A side bar can be employed on such a raised vehicle to provide an intermediate step to assist the user. Furthermore, a side bar may protect the side of the vehicle from direct collision.

A side bar is normally a straight tubular product with a step assembled on the upper surface. However, the side bar with this configuration has a low resistance and tends to deform.

SUMMARY

To solve the above-mentioned problem, a technical scheme of the present disclosure is to provide a vehicle side bar for a vehicle, wherein the vehicle side bar includes: a first bar; a second bar connected to the first bar, wherein the first bar and the second bar cooperatively form a supporting frame defining a hollow space; and a step engaged in the hollow space, configured to be mounted on the supporting frame.

To solve the above-mentioned problem, another technical scheme of the present disclosure is to provide a side bar to be mounted on a vehicle, wherein the side bar includes: a straight tube; a pair of first bent tubes connected to the straight tube to respectively form a supporting frame at a respective end of the straight tube; a pair of second bent tubes, each protruding from an elbow of a respective one of the first bent tubes to the straight tube such that the straight tube, each of the second bent tubes, and the respective one of the first bent tubes cooperatively define a hollow space; a step engaged in the hollow space and configured to be mounted on the straight tube, the first bent tubes and the second bent tubes.

To solve the above-mentioned problem, another technical scheme of the present disclosure is to provide a vehicle with the above-mentioned side bar.

DETAILED DESCRIPTION

The disclosure will now be described in detail with reference to the accompanying drawings and examples.

Figure 1:
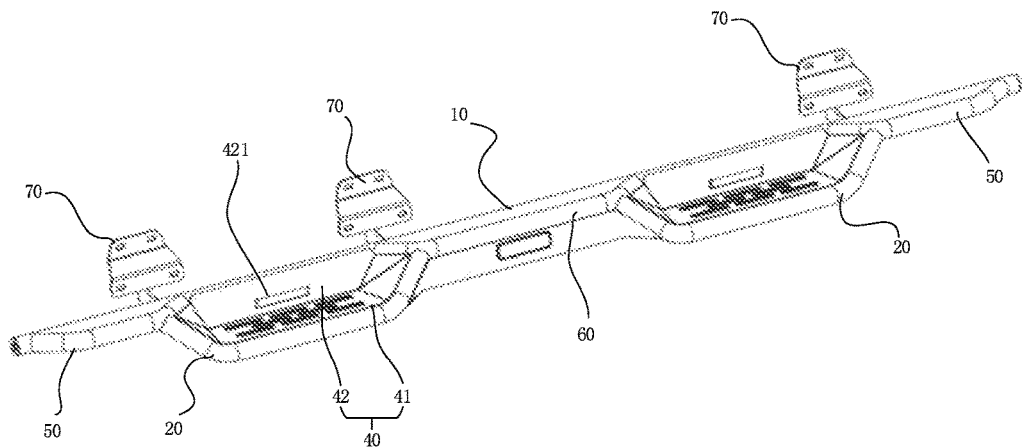
FIG. 1 is a perspective view of a vehicle side bar according to an embodiment of the present disclosure.

FIG. 1 is a perspective view of a vehicle side bar according to an embodiment of the present disclosure. The vehicle side bar shown in FIG. 1 may include a first bar 10, a second bar 20, and a step 40.

Figure 2:
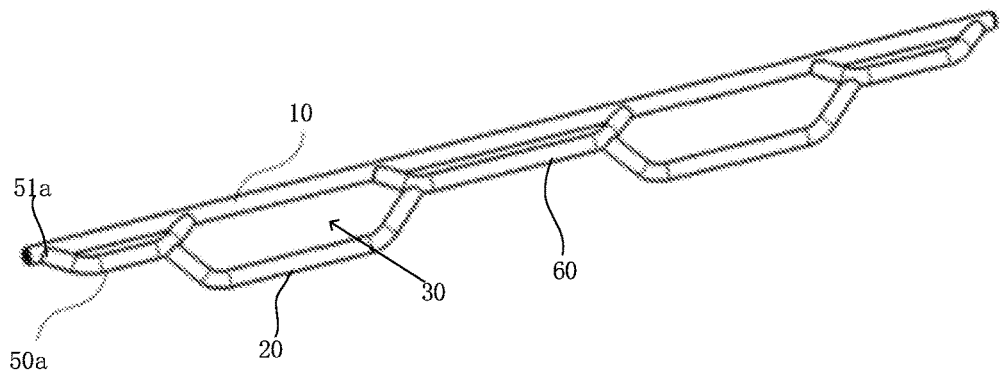
FIG. 2 shows the connection between the first bar and the third bar according to an embodiment of the present disclosure.

When the vehicle side bar is assembled on a vehicle, the first bar 10 may be connected to each side of the vehicle below the passenger cab or suspended from the chassis. The first bar 10 may be straight or according to the profile of the vehicle and cover the length of the cab. The second bar 20 may be a bent bar. When connected to the first bar 10, the second bar 20 together with the first bar 10 may form a supporting frame defining a hollow space 30, as shown in FIG. 2. The step 40 may be engaged in the hollow space 30 so as to be mounted on the supporting frame. The step 40 may be a plate which provides an intermediate step for a driver or a passenger of the vehicle. In this embodiment, two second bars 20 and two steps 40 are mounted. In other embodiment, the side bar may include only one second bar 20 and one step 40, for example, in the case that the side bar is utilized on a 3-door car.

The first bar 10 and the second bar 20 may each be a solid bar or a tube. For example, the first bar 10 and the second bar 20 may each be a tubular bar with a diameter of 38 mm and a thickness of 2 mm. Any material with sufficient strength (e.g. iron or ferroalloy) to support the step 40 may be utilized. It is appreciated that the dimensions and the material of the first bar 10 and the second bar 20 are not intended to limit the scope of the present disclosure.

The vehicle side bar of the present disclosure may provide a robust intermediate step for the user of the vehicle. The step 40 may be mounted at a comfortable position neither too far from the side of the vehicle nor too close to the vehicle by changing the configuration of the supporting frame, which leads to a better user experience.

In one embodiment, the side bar may further include a pair of third bars 50, which may be arranged to enhance the structural strength of the side bar. The pair of third bars 50 may each be connected to the first bar 10 and located at a respective end of the first bar 10. At least one end of the second bar 20 may be connected to the pair of third bars 50 instead of directly being connected to the first bar 10. Accordingly, the first bar 10, the second bars 20 and the pair of third bars 50 may cooperatively form the supporting frame.

In one embodiment, the side bar may further include a fourth bar 60. Similarly, the fourth bar 60 may be arranged to enhance the structural strength of the side bar in the case that two or more second bars 20 and steps 40 are utilized. For example, in the embodiment shown in FIG. 1, the two second bars 20 may be located at two sides of the fourth bar 60. Each of the second bars 20 may have one end connected to the fourth bar 60 instead of being connected directly to the first bar 10, and the other end connected to each of the pair of third bars 50. Accordingly, the first bar 10, the second bars 20, the pair of third bars 50, and the fourth bar 60 may cooperatively form the supporting frame.

The third bar 50 and the fourth bar 60 may have a similar configuration as the second bar 20 in terms of shape, dimension, material and processing method, etc. For example, the pair of third bars 50 and the fourth bar 60 may both be tubular bars with a diameter of 38 mm and a thickness of 2 mm. Alternatively, the pair of third bars 50 and the fourth bar 60 may also have a different configuration.

Figure 3:
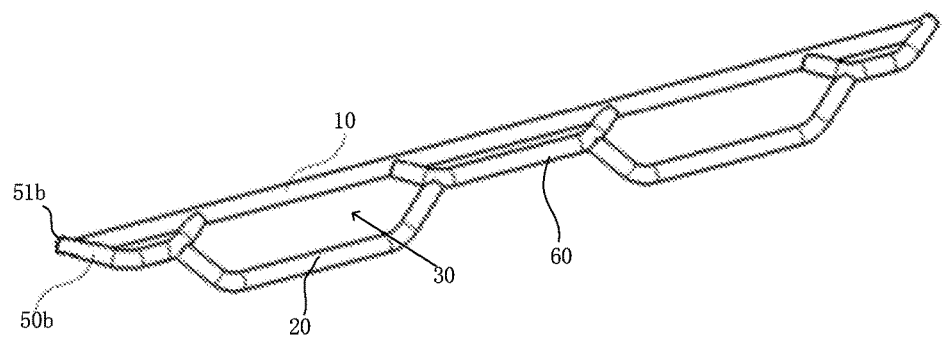
FIG. 3 shows the connection between the first bar and the third bar according to another embodiment of the present disclosure.

If the profile of the side of the vehicle is substantially straight, an end 51a of each of the pair of third bars 50a may be embedded into the first bar 10, as shown in FIG. 2. In this condition, the first bar 10 may solely fit the profile of the side of the vehicle. However, If the profile of the side of the vehicle is more like an arc, the end of the first bar 10 may be embedded into each of the pair of third bars 50b, and an end 51b of each of the pair of third bars 50b may be closer to the vehicle, as shown in FIG. 3. That is, the first bar 10 and the pair of third bars 50 may be configured to cooperatively adapt to the profile of the side of the vehicle.

Figure 4:
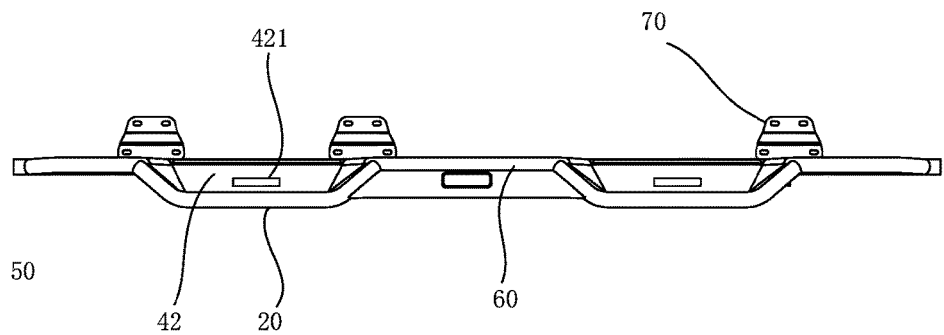
FIG. 4 illustrates the front view of the vehicle side bar shown in FIG. 1.
Figure 5:
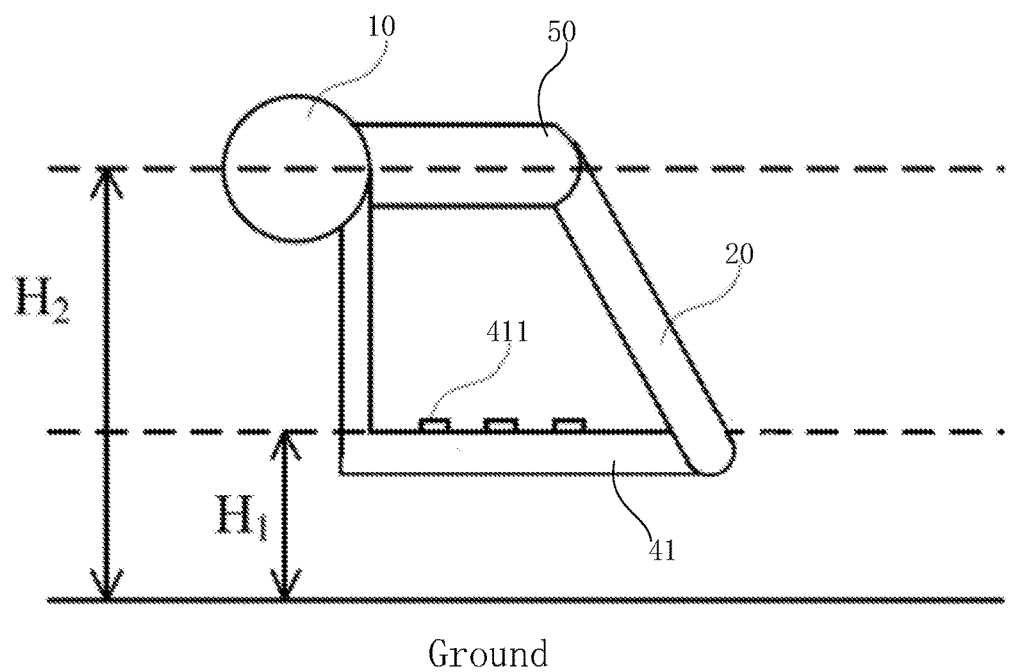
FIG. 5 is a cross-sectional view of the vehicle side bar shown in FIG. 1.

FIG. 4 illustrates the front view of the vehicle side bar shown in FIG. 1. FIG. 5 is a cross-sectional view of the vehicle side bar shown in FIG. 1. The step 40 may have a semi-box configuration including a wall 42 and a bottom 41. The wall 42 may be substantially perpendicular to the bottom 41 in this case. The wall 42 and the bottom 41 may be provided by bending a plate with a thickness of, for example, 3 mm. The wall 42 may be mounted on the first bar 10 and the bottom 41 may be mounted on the second bar 20. In this embodiment, when the side bar is mounted on the vehicle, the second bar 20 may incline towards a ground surface and the bottom 41 of the step 40 may stay substantially horizontal. Compared to the first bar 10, the bottom 41 of the step 40 may be located at a lower level which is determined by the inclination angle and the dimension of the second bar 20. For instance, as shown in FIG. 5, the distance between the ground surface and the bottom 41 of the step 40 may be $H_1$ and the distance between the ground surface and the first bar 10 may be $H_2$, wherein $H_1 < H_2$. Therefore, the step 40 may be set at a suitable level according to user's expectations.

In one embodiment, a light 421 may be assembled on the wall 42. The light 421 may be an LED or other type of light source. Single light element or multiple light elements may be utilized. The control circuit of the light 421 may be coupled with that of the door corresponding to the step 40. When the door is closed, the light 421 may be turned off. When the door is unlocked or opened, the light 421 may be turned on so as to better indicate the position of the step 40 in dark environment.

Figure 6:
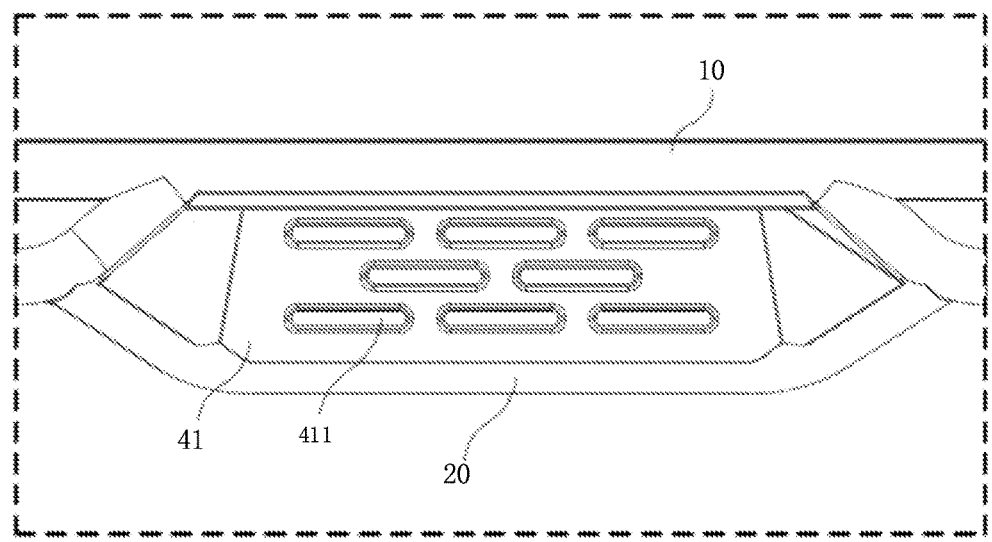
FIG. 6 illustrates the top view of the step mounted on the vehicle side bar according to an embodiment of the present disclosure.

In one embodiment, a sliding preventer 411 may be provided on the step 40 on a surface away from the ground surface. In the embodiment as shown in FIG. 5 and FIG. 6, the sliding preventer 411 is set on the upper surface of the bottom 41 of the step 40. The sliding preventer 411 may be configured to increase the friction coefficient between a foot and the step 40 so as to prevent sliding. In some embodiments, the sliding preventer 411 may be multiple rim holes. In some embodiments, the sliding preventer 411 may be several elongated rim slots. In other embodiments, the sliding preventer 411 may also be multiple rubber blocks or similar structures. The dimension and number of the sliding preventer 411 may be determined based on the size of the step 40 and will not be limited herein. Further, the sliding preventer 411 may be through holes in such a way that water and/or dust on the step 40 may be discharged out of the step 40 via the sliding preventer 411.

In one embodiment, the side bar may further include at least two brackets 70. The brackets 70 may be connected to an opposite side of the first bar 10 from the second bar 20, or to the upper surface of the second bar 20. The brackets 70 may be configured to mount the side bar on the vehicle. The brackets 70 may be welded or bolted on the chassis of the vehicle below the passenger cab. The number of the brackets 70 may be determined based on the size of the side bar and the structure of the chassis of the vehicle, and will not be limited herein.

According to the present disclosure, the above-described side bar may be mounted on a vehicle. The dimensions of the side bar such as the length of the first bar 10, the inclination angle and the dimension of the second bar 20 and the number of the steps 40 may be carefully selected to provide a comfortable intermediate step for the user of the vehicle.

It is to be understood that the above-mentioned technical features may be used in any combination without limitation. Use of ordinal numbers such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name to distinguish the claim elements.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A vehicle side bar for a vehicle, comprising:
    a first bar;
    a pair of third bars each connected to the first bar and located at a respective end of the first bar, wherein the first bar and each of the pair of third bars cooperatively define an opening;
    a second bar connected to the first bar and the pair of third bars, wherein the first bar, the pair of third bars and the second bar cooperatively form a supporting frame defining a hollow space;
    a fourth bar connected to the first bar; wherein the second bar comprises two sub bars located at two sides of the fourth bar; each of the sub bars is connected to the first bar through the fourth bar and one of the pair of third bars; the two sub bars, the first bar, the pair of third bars, and the fourth bar cooperatively form the supporting frame; and
    a step engaged in the hollow space, and configured to be mounted on the supporting frame.

2. The vehicle side bar of claim 1, wherein the first bar, the second bar, the pair of third bars, and the fourth bar have a tube configuration.

3. The vehicle side bar of claim 1, wherein the first bar is substantially straight; the pair of third bars each extends closer towards the vehicle than the respective end of the first bar to adapt to a profile of a side of the vehicle.

4. The vehicle side bar of claim 1, wherein
    the step comprises a wall mounted on the first bar and a bottom mounted on the second bar, the wall is substantially perpendicular to the bottom; and when the vehicle side bar is mounted on the vehicle, the second bar inclines towards a ground surface while the bottom of the step stays substantially horizontal to the ground surface.

5. The vehicle side bar of claim 4, wherein a light is assembled on the wall of the step.

6. The vehicle side bar of claim 1, wherein a sliding preventer is further provided on the step on a surface away from a ground surface.

7. The vehicle side bar of claim 1, further comprising brackets connected to an opposite side of the first bar from the second bar, and configured to mount the vehicle side bar on the vehicle.

8. A side bar to be mounted on a vehicle, comprising
a straight tube;
a pair of first bent tubes connected to the straight tube, wherein the straight tube and each of the pair of first bent tubes cooperatively define an opening;
a pair of second bent tubes, each protruding from an elbow of a respective one of the first bent tubes to the straight tube such that the straight tube, each of the second bent tubes, and the respective one of the first bent tubes cooperatively define a hollow space; and
a step engaged in the hollow space and configured to be mounted on the straight tube, the first bent tubes and the second bent tubes.

9. The side bar of claim 8, further comprising a reinforcing tube mounted between the second bent tubes.

10. The side bar of claim 9, wherein
the step has a semi-box configuration comprising a wall mounted on the straight tube and a bottom mounted on the respective one of the first bet tubes, the wall is substantially perpendicular to the bottom; and
when the side bar is mounted on the vehicle, the first bent tubes incline towards a ground surface while the bottom stays substantially horizontal to the ground surface.

11. The side bar of claim 10, wherein a sliding preventer is further provided on the bottom at a surface away from the ground surface.

12. The side bar of claim 10, wherein a light is assembled on the wall.

13. The side bar of claim 10, further comprising brackets connected to an opposite side of the straight tube from the first bent tubes, and configured to mount the side bar on the vehicle.

14. A vehicle, wherein a side bar is mounted on a side of the vehicle, and the side bar comprising:
a straight tube;
a pair of first bent tubes connected to the straight tube, wherein the straight tube and each of the pair of first bent tubes cooperatively define an opening;
a pair of second bent tubes, each protruding from an elbow of a respective one of the first bent tubes to the straight tube such that the straight tube, each of the second bent tubes and the respective one of the first bent tubes cooperatively define a hollow space; and
a step engaged in the hollow space and configured to be mounted on the side bar.

15. The vehicle of claim 14, wherein the side bar further comprises a reinforcing tube mounted between the second bent tubes.

16. The vehicle of claim 15, wherein
the step has a semi-box configuration comprising a wall mounted on the straight tube and a bottom mounted on the respective one of the first bet tubes, the wall is substantially perpendicular to the bottom; and
when the side bar is mounted on the vehicle, the first bent tubes incline towards a ground surface while the bottom stays substantially horizontal to the ground surface.

17. The vehicle of claim 16, wherein a sliding preventer is further provided on the bottom at a surface away from the ground surface; and a light is assembled on the wall.

18. The vehicle of claim 16, wherein the side bar further comprises brackets connected to an opposite side of the straight tube from the first bent tubes, and configured to mount the side bar on the vehicle.

* * * * *